Patented Apr. 20, 1954

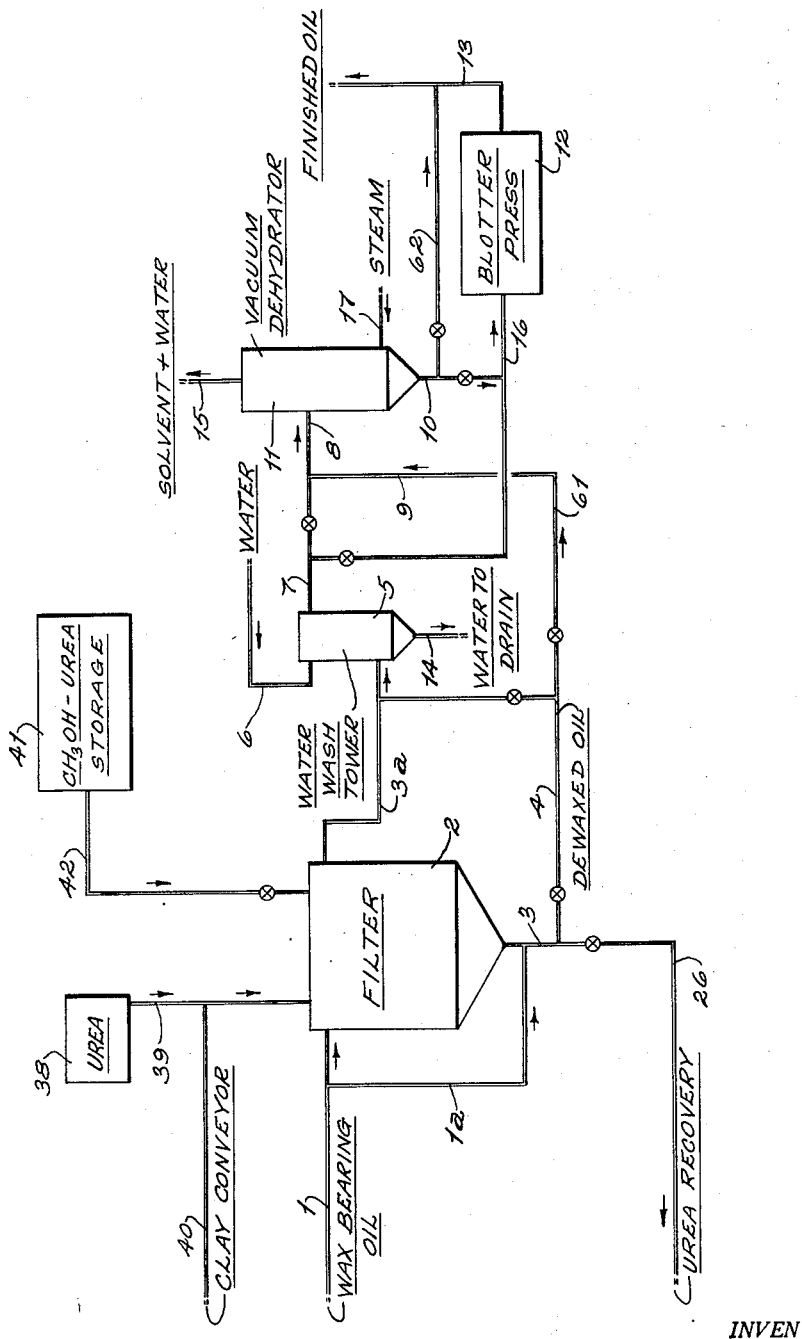

2,676,141

UNITED STATES PATENT OFFICE 2,676,141

PROCESS FOR REMOVING WAX AND OTHER IMPURITIES FROM OIL

Vernon H. Kane and George R. Bellville, Jr., Port Arthur, Tex., assignors to The Texas Company, New York, N. Y., a corporation of Delaware Application June 30, 1950, Serial No. 171,468

6 Claims. (Cl. 196—17)

This invention relates to a process for removing wax constituents and other undesirable matter from an oil, such as mineral oil. More particularly, it involves a process for treating an oil with an organic compound which forms crystal complexes with various types of hydrocarbon materials. Examples of the complex-forming organic compounds which are used in the process of this invention are urea and thiourea.

This application is a continuation-in-part of our co-pending application, Serial No. 84,066, filed March 29, 1949, wherein there is disclosed a process for effecting complex formation by contacting an organic mixture containing complex-forming compounds with a contact mass comprising complexing agent and a solid supporting material which can be either an adsorbent compound or a non-adsorbent granular solid. In the parent application it is disclosed that the composite contacting mass comprising complexing agent and supporting material can be employed either in a stationary bed or in a slurry-type system. This invention involves the discovery that when complex formation is effected by contact of organic mixture with a stationary bed of composite contacting agent, there is a critical concentration of complexing agent in the contact mass. Unless the contact mass contains the prescribed critical proportions of complexing agent and supporting material, successful operation is not realized.

In accordance with the process of this invention, organic mixtures containing compounds that form complexes with complexing agents of the urea type are contacted with a stationary bed of a composite contact mass comprising 5 to 35 per cent complexing agent and 65 to 95 per cent supporting carrier. On passage of the organic mixture containing complex-forming compounds through the stationary contact mass of the prescribed composition, complex formation occurs and the resulting complexes are removed from the organic mixture and remain within the stationary bed of contact mass. The filtrate obtained by contact with the bed of prescribed composition is substantially free of complex-forming constituents. Contact of the organic mixture with the composite contact mass is effected at temperatures up to 180° F. Although sub-zero temperatures may be employed for the complex formation and are indeed recommended in certain modifications thereof, normally temperatures between 70 and 150° F. are employed. When complex formation is effected by passage of an organic mixture through a composite contact mass of the prescribed composition, removal of complex-forming constituents from an organic mixture is readily accomplished by a simple process which is free from operational difficulties.

The process of the invention is particularly applicable to the removal of waxy components from a wax-bearing oil to produce wax-free product. In such processes advantage is taken of the specificity of urea in complex formation. Urea forms complexes with normal aliphatic hydrocarbons containing four or more carbon atoms. Reduced temperatures are required for the formation of urea complexes with $C_4$ to $C_8$ hydrocarbons, whereas complex formation occurs at atmospheric temperatures with normal hydrocarbons containing ten or more carbon atoms. Some terminally-substituted normal hydrocarbons such as normal decanol and 1-chloro-dodecane also form complexes with urea. Normal paraffin waxes are readily removed by the process of this invention from gas oil fractions to produce low pour diesel oils which are in demand for cold weather operation of diesel engines and from low wax content lubricating oil stocks to produce turbine oils, refrigerator oils and hydraulic oils characterized by very low pour and Freon haze test. In further description of the process of this invention, the complex-forming reaction of urea with normal paraffins will be used to illustrate the invention.

The formation of complexes between normal aliphatic compounds and urea is facilitated by the presence of at least a small quantity of a liquid having mutual solubility for the complex-forming agent and hydrocarbons. Water and low molecular weight oxygenated compounds are effective in expediting complex formation; alcohols such as methyl, propyl and butyl alcohols, ketones such as acetone, methyl ethyl ketone and methyl isobutyl ketone are examples of oxygenates that promote complex formation. Apparently these solvents facilitate complex formation by acting as a medium for molecular contact between urea and the normal hydrocarbons. In the process of this invention the carrier portion of the composite contact mass acts as a reservoir for the polar solvent so that complex formation between organic complexing agent and waxy components of a feed oil is promoted by the presence of relatively small quantities of polar compound. Wetting the bed with polar solvent prior to introduction of the feed oil into the contact zone provides sufficient complex-promoting polar solvent to cause rapid complex formation throughout the whole period of contact.

The carrier portion of the composite contact mass is advantageously a solid adsorptive material which may be either a synthetic adsorbent or a naturally occurring earth or clay; silica gel, fuller's earth, and bauxite are examples of adsorbents that are particularly useful in the process of this invention. Non-adsorbent granular solids, such as sand, may also be employed but their use is not recommended. The use of an adsorbent carrier is particularly advantageous because a substantial measure of refining is effected in addition to wax removal. When the composite contact mass comprises urea and an adsorbent carrier such as Porocel in the prescribed quantities, there is effected not only substantial improvement in the pour point and haze test of the resulting oil, but there is also realized a substantial color improvement. Accordingly, in the preferred modification of this invention the composite contact mass comprises 5 to 35 per cent urea and 65 to 95 per cent solid adsorbent particles. When non-adsorbent supporting materials such as sand, kieselguhr, etc. are employed, only dewaxing of the oil stock is effected and there is no accompanying refining of the oil fraction.

The contact mass advantageously contains 15 to 30 per cent complexing agent and 70 to 85 per cent carrier. Ordinarily complex formation is effected with a contact mass having a composition within this preferred range. An especially preferred contact mass contains approximately 25 per cent urea and 75 per cent Porocel.

Contact of the oil with the composite contact mass is effected at temperatures above the pour point of the oil to temperatures of 180° F., at which temperature substantial decomposition of the complex occurs. Ordinarily the contact is effected at temperatures between 70 and 125° F.

The process of the invention is illustrated by subjecting a turbine oil to contact with a stationary bed of composite contact mass comprising 25 per cent urea and 75 per cent of 15 mesh Porocel. The feed turbine oil is characterized by the following tests:

| | |
|---|---|
| Gravity, ° API | 23.7 |
| Flash, COC, ° F | 385 |
| Fire, COC, ° F | 440 |
| Viscosity, SSU at 100° F | 305 |
| Viscosity, SSU at 130° F | 133 |
| Color, 6" Lovi | 85 |
| Pour, ° F | −25 |
| Corr. Cu strip at 212° F | Neg. |
| Neut. No | 0.02 |
| Sap. No | 0.06 |
| Ash, per cent | None |
| Emulsion at 130° F.: | |
|   Distilled water | 40-40-0-30 |
|   Salt water (1%) | 40-40-0-30 |
|   N/1 caustic solution | 40-40-0-30 |
| Demulsibility at 130° F | 900 |
| Dielectric strength, volts | 25,800 |
| Freon wax precipitation test[1]: | |
|   Haze, ° F | Above −22 |
|   Floc, ° F | Above −22 |

[1] This test consists of mixing nine cc. of Freon-12 with one cc. of oil to be tested, chilling the mixture at the rate of 1 to 2° F./min. and observing the temperatures at which wax is first observed (haze temperature) and the temperature at which large agglomerates of wax form (floc temperature).

In the accompanying figure there is illustrated the processing steps to which the feed turbine oil is subjected in order to yield a finished product of low Freon haze test and improved color characteristics, which is an excellent refrigerator oil.

A filter vessel 2 is filled with about 35 to 60 tons of filter medium comprising a contact mass consisting of 25 weight per cent urea and 75 weight per cent Porocel. A preferred manner of preparation involves carrying adsorbent on conveyor 40 and mixing a predetermined quantity of urea delivered in particle form from storage hopper 38 by conveyor 39. This mixture containing the prescribed concentration of urea and adsorbent is then charged to the filter 2.

The bed is then saturated with a saturated solution of urea in methyl alcohol at about 100° F. delivered from storage vessel 41 by pipe 42.

A stream of the charge oil is conducted from a source not shown through pipe 1 at a temperature of about 100° F. and introduced either to the top of filter vessel 2 or alternately through pipe 1a to the bottom of the filter vessel 2. Anti-gravity flow is preferred because the rate of flow is more easily controlled in this type of operation.

The feed oil stream is introduced at a rate of about 1.0 to 2.0 barrels of oil per ton of adsorptive medium per day and allowed to flow or is pumped through the filter bed. During passage through the filter bed the clay exerts a decolorizing action upon the oil and also adsorbs other impurities, such as previously mentioned. Simultaneously, the urea crystals in the filter bed enter into complex formation with the wax constituents contained in the feed oil.

The flow of oil is continued through the filter bed until the activity of the contact mass, as indicated by degree of dewaxing or other purification effected, begins to decline substantially at which point the flow of fresh feed oil is discontinued to permit recovery of the chemicals in the spent filter bed and regeneration of the contact mass, as described later. Employing a contact mass of the prescribed composition, the complexing ability of the filter bed is exhausted prior to clogging of the unit due to complex formation.

During the period of processing flow, the treated oil is discharged from the filter through a pipe 3 or 3a, at the top or bottom of the filter, depending on whether gravity or anti-gravity flow is employed, into a tower 5 wherein any solvent or urea, picked up by the oil in its passage through the contact mass, is removed by solution in a countercurrent stream of water or other solvent introduced through pipe 6 into a zone at the opposite end of the tower. The oil is removed from the tower through pipe 7 into either a vacuum dehydrator 11 by way of pipe 8 or through a conventional blotter press 12 by way of pipe 16, to effect a final drying by removing residual traces of solvent. Finished oil is discharged from the system through pipe 13.

Alternately, depending upon the solvent and urea content of the dewaxed oil, the dewaxed oil may be conducted through pipes 3 or 3a, 4 and 61 directly into vacuum dehydrator vessel 11 where steam may optionally be introduced through line 17 to effect removal of solvent overhead through pipe 15. The oil from the vacuum dehydrator in this scheme of operation is conducted through pipes 10 and 16 into blotter press 12 to effect removal of solid urea which may be present in the oil, as well as any residual moisture which may remain after the dehydration operation, or it may be removed from the dehydrator through pipes 10, 62 and 13 as finished oil.

The effluent water from tower 5 is drawn off through pipe 14 to reject, or the minor amounts of solvent, less than about 0.5 per cent by weight of the water, and urea, less than about 0.2 per cent by weight of the water, may be recovered by any suitable methods.

Similarly, the overhead vapors from dehydrator 11 are removed through pipe 15 and condensed and may be rejected or further processed in tower 20, Figure 2, to recover the solvent contained therein.

The properties of the product oil which is both dewaxed and freed from color impurities by contact with a composite contact mass comprising 25 per cent urea and 75 per cent Porocel are indicated in the following table:

| | |
|---|---|
| Gravity, ° API | 23.2 |
| Flash, COC, ° F | 375 |
| Fire, COC, ° F | 425 |
| Viscosity, SSU at 100° F | 311 |
| Viscosity, SSU at 130° F | 135 |
| Color, 6″ Lovi | 60 |
| Pour, ° F | −35 |
| Corr. Cu strip at 212° F | Neg. |
| Neut. No | .02 |
| Sap. No | .06 |
| Ash, per cent | None |
| Emulsion at 130° F.: | |
| Distilled water | 40-40-0-15 |
| Salt water (1%) | 40-40-0-15 |
| N/1 caustic | 40-40-0-15 |
| Demulsibility at 130° F | 1620 |
| Dielectric strength, volts | 31,300 |
| Freon wax precipitation test: | |
| Haze, ° F | −65 |
| Floc, ° F | below −80 |

It is apparent that Freon haze test of the treated oil is substantially improved over that of the feed oil; the treated oil which has a haze test of −65° F. is an excellent refrigerator oil. It will also be noted that a 25 unit improvement in Lovibond color is effected by treatment in accordance with the process of the invention.

If the composite contact mass contained more than 35 per cent urea, plugging of the contactor would have resulted within a short period after initial contact. If less than 5 per cent urea were present in the composite contact mass, substantially no removal of complex-forming constituents would be effected. It is apparent then that it is necessary to maintain the composition of the contact mass within the specified critical ranges in order to have a feasible operation.

Regeneration of the composite contact mass is effected by means which are disclosed in the co-pending aforementioned parent application. The complex may be removed from the bed by passing a hot hydrocarbon solvent at a temperature of 125 to 250° F. therethrough or by means of water at a temperature above 190° F. The hydrocarbon solvent decomposes the complex and removes the normal paraffins therefrom in solution. The hot water solution decomposes the complex and dissolves urea with the resulting formation of a 2-phase system in which the upper layer is predominantly paraffinic waxes and the lower layer is aqueous urea solution. After removal of complex and urea from the bed, the adsorbent can be regenerated by burning with air at a temperature of 900 to 1100° F. After regeneration of the adsorbent by burning, urea which has been isolated from the aqueous solution obtained on decomposition of the complex can be recombined with the adsorbent in the prescribed proportions to form a reactive composite contact mass.

Various means are available for wetting the composite contact mass with polar solvent. As indicated previously, the contact mass can be wet prior to the charge of the hydrocarbon solution by passing a small quantity of oxygenated hydrocarbon therethrough. A preferred method of effecting wetting of the bed involves passing a urea-saturated solution of solvent through the bed of contact mass prior to introduction of the organic mixture thereto. A third alternative involves incorporating a small percentage of oxygenated hydrocarbon in the charge material; for example, the incorporation of 1 to 2 per cent of 50-50 methyl-isopropyl alcohol mixture in the charge hydrocarbon supplies the required amount of polar oxygenated hydrocarbon for rapid complex formation between the urea and the normal paraffinic constituents of the charge.

Oils which have been contacted with urea appear to have superior oxidation characteristics to those of oil contacted with clay alone. Refrigerator oil obtained by the process of this invention appears to have foaming characteristics superior to those of oil which has not been contacted with urea.

The water-separating characteristics of lubricating oil stocks are improved by the preferred process of this invention which is effective in separating resins and oxygenated materials from the feed oil.

Also, it is contemplated that the process has application to treatment of other types of oils than those specifically mentioned, including oils derived from animal, vegetable and marine sources, as well as those produced by synthetic means.

When the process of the invention is employed in the treatment of relatively viscous lubricating oil stocks in commercial size filters, it is advantageous to dilute the feed oil with a light hydrocarbon fraction. Apparently high viscosity oils tend to channel through the contact mass so that incomplete complex formation occurs between the urea of the contact mass and the normal paraffinic constituents of the viscous oil. This difficulty is simply obviated by reducing the viscosity of the oil stock by the addition of a diluent hydrocarbon fraction. In general, the viscosity of lubricating oil should be reduced below 100 Saybolt Universal visc. at 100° F. prior to its treatment in the process of the invention. For example, a lubricating oil stock having a Saybolt Universal visc. of 300 at 100° F. is cut back with 15 per cent naphtha to give the diluent mixture a Saybolt Universal visc. of 80; the diluted mixture is readily dewaxed in accordance with the process of this invention, whereas the heavy undiluted oil can not be dewaxed readily in commercial size filters.

It will be understood that in practice a plurality of filter vessels may be employed so that when one vessel is off-stream for reactivation, the feed stream of oil can be diverted to another vessel used for the same purpose.

Obviously, many modifications and variations of the invention as hereinbefore set forth may be made without departing from the spirit and scope thereof and, therefore, only such limitations should be imposed as are indicated in the appended claims.

We claim:

1. In a process for separating complex-forming hydrocarbons which are predominantly normally aliphatic in nature from a hydrocarbon mixture by contact with urea, the steps which comprise disposing within a contacting zone a contact mass comprising 5 to 35 per cent urea and 65 to 95 per cent solid adsorbent, passing said hydrocarbon mixture in the liquid phase in contact with said mass in the presence of at least a small amount of polar solvent having mutual solubility for urea and hydrocarbons and selected from the group consisting of water and oxygenated hydrocarbons, effecting said contact at a temperature up to 180° F. whereby the complex-forming hydrocarbon constitutents of said hydrocarbon mixture enter into complex formation with said urea, and discharging from said contact zone a hydrocarbon mixture from which complex-forming hydrocarbon constituents have been removed.

2. A process according to claim 1 in which the solid adsorbent is selected from the group consisting of synthetic adsorbents and naturally occurring clays and earths.

3. A process according to claim 1 in which the hydrocarbon mixture is a wax-bearing oil.

4. A process according to claim 1 in which the contact mass comprises 15 to 30 per cent urea and 70 to 85 per cent solid adsorbent.

5. In a process for separating waxy constituents from a viscous wax-bearing oil by contact with urea, the steps which comprise disposing within a contacting zone a contact mass comprising 5 to 35 per cent urea and 65 to 95 per cent solid adsorbent, diluting said wax-bearing oil with a light hydrocarbon fraction, passing said diluted wax-bearing oil in the liquid phase in contact with said mass in the presence of at least a small amount of polar solvent having mutual solubility for urea and hydrocarbons and selected from the group consisting of water and oxygenated hydrocarbons, effecting said contact at a temperature between 70 and 120° F. whereby the waxy components of said oil enter into complex formation with said urea, and discharging from said contact zone a stream of oil from which waxy constituents have been removed.

6. A process according to claim 5 in which the contact mass comprises 15–30 per cent urea and 70–85 per cent solid adsorbent.

References Cited in the file of this patent

UNITED STATES PATENTS

| Number | Name | Date |
|---|---|---|
| 1,278,023 | Rosenbaum | Sept. 3, 1918 |
| 1,509,325 | Weir et al. | Sept. 23, 1924 |
| 1,830,859 | Schotte | Nov. 10, 1931 |
| 2,381,293 | La Lande | Aug. 7, 1945 |
| 2,386,354 | Schulze et al. | Oct. 9, 1945 |
| 2,499,820 | Fetterly | Mar. 7, 1950 |
| 2,520,716 | Fetterly | Aug. 29, 1950 |
| 2,546,328 | Arabian et al. | Mar. 27, 1951 |
| 2,560,193 | Shoemaker | July 10, 1951 |

OTHER REFERENCES

Technical Oil Mission, Reel 143, translation by Shell Development Co. of German application B 190,197 (Bengen); deposited in Library of Congress, May 22, 1946; included in Index released May 31, 1946 (5 pages, pages 2–6 inclusive only).